United States Patent [19]
Jones

[11] Patent Number: 5,821,324
[45] Date of Patent: *Oct. 13, 1998

[54] ULTRAVIOLET CURABLE EPOXIDIZED ALKYDS

[75] Inventor: Raymond H. Jones, Lynn Haven, Fla.

[73] Assignee: International Paper Company, Tuxedo Park, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 762,251

[22] Filed: Dec. 9, 1996

Related U.S. Application Data

[62] Division of Ser. No. 388,926, Feb. 15, 1995, Pat. No. 5,612,445.

[51] Int. Cl.⁶ .................................................. C08G 63/48
[52] U.S. Cl. ...................... 528/295.5; 528/302; 528/307
[58] Field of Search ............................... 528/295.5, 302, 528/307

[56] References Cited

U.S. PATENT DOCUMENTS

| | | | |
|---|---|---|---|
| Re. 30,660 | 6/1981 | Laganis | 528/296 |
| 1,811,115 | 6/1931 | Ellis | 525/437 |
| 1,847,783 | 3/1932 | Pieper | 528/295.5 |
| 1,875,408 | 9/1932 | Amieva, Jr. | 528/295.5 |
| 2,088,612 | 8/1937 | Rosenblum | 260/8 |
| 2,251,298 | 8/1941 | Soday | 260/22 |
| 2,528,946 | 11/1950 | Coffey et al. | 260/22 |
| 3,112,284 | 11/1963 | Greenlee et al. | 260/22 |
| 3,113,932 | 12/1963 | Greenlee et al. | 260/22 |
| 3,477,976 | 11/1969 | Nakamuro et al. | 260/22 |
| 3,586,653 | 6/1971 | Fritz | 260/22 |
| 3,673,140 | 6/1972 | Ackerman et al. | 523/454 |
| 3,816,365 | 6/1974 | Schmid et al. | 525/297 |
| 3,893,959 | 7/1975 | Layman | 528/295.3 |
| 3,920,595 | 11/1975 | Anderson et al | 525/577.5 |
| 4,058,401 | 11/1977 | Crivello | 96/115 |
| 4,125,521 | 11/1978 | Murakami et al. | 525/443 |
| 4,131,579 | 12/1978 | Mummenthey et al. | 260/22 |
| 4,138,255 | 2/1979 | Crivello | 96/35.1 |
| 4,161,478 | 7/1979 | Crivello | 260/327 |
| 4,175,972 | 11/1979 | Crivello | 204/159.18 |
| 4,181,638 | 1/1980 | Lasher | 260/22 D |
| 4,217,257 | 8/1980 | Kuzma | 260/22 |
| 4,245,029 | 1/1981 | Crivello | 430/280 |
| 4,248,745 | 2/1981 | Laganis | 260/22 D |
| 4,256,828 | 3/1981 | Smith | 430/280 |
| 4,273,668 | 6/1981 | Crivello | 260/239 |
| 4,318,766 | 3/1982 | Smith | 156/330 |
| 4,335,027 | 6/1982 | Cremeans et al. | 528/297 |
| 4,407,759 | 10/1983 | Crivello | 260/440 |
| 4,417,061 | 11/1983 | Crivello | 549/3 |
| 4,474,940 | 10/1984 | Wilk et al. | 528/297 |
| 4,474,941 | 10/1984 | Wilk et al. | 528/297 |
| 4,627,876 | 12/1986 | Fries et al. | 106/27 |
| 4,649,175 | 3/1987 | Inoue et al. | 528/295.3 |
| 4,686,275 | 8/1987 | Bryant et al. | 528/295.5 |
| 4,719,254 | 1/1988 | Levine | 525/438 |
| 4,927,669 | 5/1990 | Knox et al. | 427/239 |
| 4,997,480 | 3/1991 | Rao | 106/251 |
| 5,053,483 | 10/1991 | Knox | 528/295.5 |
| 5,055,548 | 10/1991 | Cosgrove | 528/272 |
| 5,096,959 | 3/1992 | Jones et al. | 524/600 |
| 5,158,608 | 10/1992 | Sodhi | 106/244 |
| 5,269,839 | 12/1993 | Sodhi | 106/243 |
| 5,324,350 | 6/1994 | Bender et al. | 528/295.5 |
| 5,378,757 | 1/1995 | Blount, Jr. et al. | 528/295.5 |
| 5,538,760 | 7/1996 | Sharma | 427/388.4 |

FOREIGN PATENT DOCUMENTS

600546A1  11/1993  European Pat. Off. .

OTHER PUBLICATIONS

Russian Publication #37484413 Otkrytiya, Izobret., Prom Obraztsy, Tovarnye Znaki, vol. 50(15), Publication Date Apr. 22, 1970.

*Primary Examiner*—Randy Gulakowski
*Attorney, Agent, or Firm*—Michael J. Doyle, Esq.; Hoffman, Wasson & Gitler

[57] ABSTRACT

The epoxidation of alkyds containing anhydrides or diacids with cycloaliphatic unsaturation results in epoxy resins which cure rapidly in UV light to produce uniform films without the use of flow modifiers. The fatty acid portion of the alkyd functions as an internal plasticizer. Crosslinking occurs through oxirane rings in both the anhydride and fatty acid moieties of the alkyd to produce hard, but not brittle films. Excellent water resistance is obtained without thermal post curing.

8 Claims, No Drawings

ULTRAVIOLET CURABLE EPOXIDIZED ALKYDS

This is a divisional of application Ser. No. 08/388,926 filed on Feb. 15, 1995, now U.S. Pat. No. 5,612,445.

BACKGROUND OF THE INVENTION

This invention relates to solventless, internally plasticized epoxy compositions which cure rapidly in ultraviolet light. A suitable photoinitiator, such as triphenylsulfonium hexafluorophosphate [($\phi$)$_3$ S$^+$ PF$_6^-$], is required. Sunlight or UV lamps may be used as radiation sources. The mechanism of cure is cationic rather than free radical. When a photon strikes the photoinitiator, a strong acid (HPF$_6$) is generated. This acid initiates crosslinking through oxirane rings resulting in a network polymer.

A comparison of this invention with related technologies is shown in Table I.

TABLE I

| Comparison | Conventional Alkyd | Conventional Epoxy | Cycloaliphatic Epoxy | Invention |
|---|---|---|---|---|
| Number of Components | One (plus drier) | Two | One (plus photoinitiator) | One (plus photoinitiator) |
| Cure Type | Autoxidation | Chemical | UV | UV |
| Cure Mechanism | Free Radical | Addition | Cationic | Cationic |
| Cure Time | Moderate to slow | Moderate to slow | Rapid | Rapid |
| Latent Cure | Yes | No | Yes | Yes |
| Solvent Use | Yes | Yes | No | No |
| Externally Plasticized | No | No | Yes | No |
| Internally Plasticized | Yes (by fatty acid) | Yes (by curing agent) | No | Yes (by fatty acid) |

Conventional alkyds are oil modified polyesters. Without oil modification, the polyester is a brittle solid. By incorporating unsaturated fatty acids into the polyester, a film with the desired flexibility can be obtained. Alkyds are comprised of an anhydride or diacid, a polyol, and unsaturated fatty acids. Examples of these would be phthalic anhydride, glycerine, and tall oil fatty acid. Vegetable oils, such as soybean oil, contribute both polyol and unsaturated fatty acids to an alkyd formulation. The cure of an alkyd is through autoxidation by a free radical mechanism. The sites of crosslinking are carbons adjacent to unsaturation. Alkyds are one of the most widely used protective coatings due to their durability and relatively low cost. Alkyds typically contain solvents for viscosity reduction.

Conventional epoxy resins are multifunctional glycidyl ethers derived from the reaction of bisphenol A and epichlorhydrin. The oxirane rings of these resins react with amine curing agents, such as reactive polyamides, by chemical addition. The resulting polymer is widely used in protective coatings when superior corrosion and water resistance is required. Solvents are used to reduce the viscosity of the two component reaction mixture.

Cycloaliphatic epoxy resins, such as (3,4-epoxycyclohexyl)methyl-3,4-epoxycyclohexane carboxylate

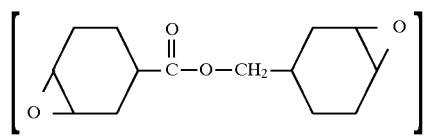

have previously been employed as solventless epoxy compositions which cure rapidly in ultraviolet light. These resins produce rigid films without the addition of a plasticizer. A flow modifier is typically added to prevent surface defects. Reactive diluents, such as propylene glycol monomethylether, may be added to reduce the viscosity of the formulation.

Cationic polymerization of epoxy resin materials by the use of certain radiation sensitive aromatic onium salts of Group Via elements was disclosed in U.S. Pat. No. 4,058,401 to Crivello. Epoxy resins polymerizable to a higher molecular weight were identified. Examples of photoinitiators identified were triphenylsulfonium hexafluoroarsenate, triphenylsulfonium hexafluoroantimoniate, and triphenylsulfonium tetrafluoroborate. Disclosure of this type of photoinitiator was expanded by Crivello in U.S. Pat. No. 4,161,478 which specifically addresses triphenylsulfonium hexafluorophosphate. A method for effecting the cationic polymerization of epoxy resins with this type of photoinitiator was disclosed by Crivello in U.S. Pat. No. 4,138,255.

Photocopolymerizable compositions based on epoxy and hydroxyl-containing organic materials were disclosed by Smith in U.S. Pat. No. 4,256,828. A process for this polymerization was disclosed by Smith in U.S. Pat. No. 4,318,766. Crivello discussed the use of a hydroxy functional flexibilizer in U.S. Pat. No. 4,175,972. These patents also involved the use of photosensitive aromatic sulfonium salts.

Simultaneous free radical and cationic cure of mixtures of certain oxirane containing and aliphatically unsaturated containing organic resins was addressed by Crivello in U.S. Pat. No. 4,245,029. Arylsulfonium salt-solvent mixtures were disclosed as photoinitiators by Crivello in U.S. Pat. No. 4,273,668. Propylene carbonate was specifically identified as a solvent. Additional photoinitiators were identified by Crivello in U.S. Pat. Nos. 4,407,759 and 4,417,061. General structures for these photoinitiators are

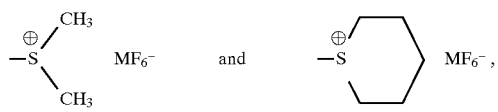

respectively.

It is an object of the present invention to produce a durable ultraviolet curable epoxidized alkyd resin coating that cures through a cationic mechanism. It is a further object to produce a durable ultraviolet curable epoxidized alkyd coating that is internally plasticized to produce hard but not brittle films without the use of external plasticizers.

It is a further object to produce a durable ultraviolet curable epoxidized alkyd coating which is water resistant without thermal post-curing.

It is a further object to produce a durable ultraviolet curable epoxidized alkyd coating which is uniform without the use of flow modifiers.

It is an object of the invention to produce a film which is internally plasticized through the use of tall oil fatty acids. These fatty acids act as an internal plasticizer due to their long aliphatic chains. Further, they provide a site for curing by epoxidation of their unsaturation.

DESCRIPTION OF THE PREFERRED EMBODIMENTS

An epoxidized alkyd prepared from tall oil fatty acid, glycerine, and tetrahydrophthalic anhydride (THPA) is illustrated as follows:

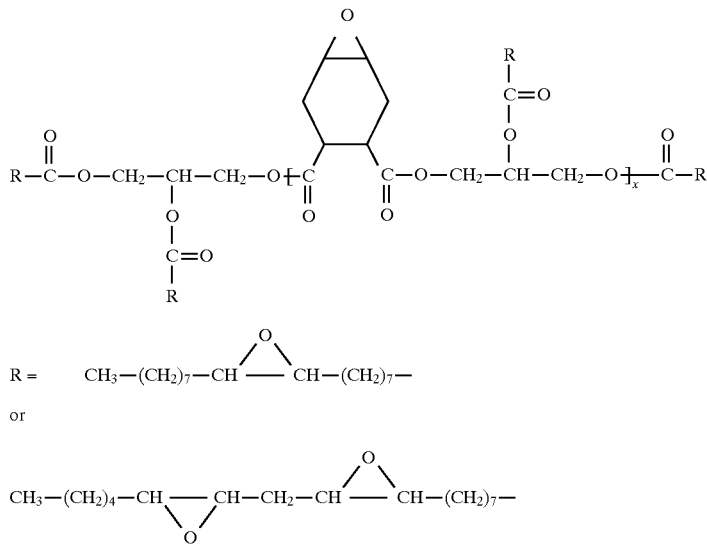

A suitable photoinitiator, such as triphenyl sulfonium hexafluorophosphate, is mixed with the epoxy resin at a concentration of 3% by weight. This mixture is stable in the absence of UV light. When a photon strikes the photoinitiator, a strong acid is generated which initiates rapid cationic cure through the oxirane rings of the epoxy resin.

The use of an epoxy grade of tall oil fatty acid (TOFA), such as ACINTOL® EPG from Arizona Chemical Company, precludes the need to remove dimethoxystilbene (DMS) from the alkyd with a wiped film evaporator (WFE). When DMS is present during epoxidation of the alkyd, a dark red complex results. Oleic acid, such as EMERSOL® 221 from the Emery Industries Division of Henkel Corporation, gave similar results to those from ACINTOL® EPG without a WFE step. Other TOFAs, such as ACINTOL® FA-2, gave similar results to ACINTOL® EPG when DMS was removed from the alkyd by WFE distillation. Crosslinking of the oxirane rings in the TOFA or oleic acid moieties of the epoxidized alkyd in addition to cross linking of the cycloaliphatic oxirane rings of the anhydride moiety result in hard, but not brittle films.

Glycerine is the preferred polyol of this invention. Trimethylolpropane can be used when a more flexible coating is desired, although a slower cure rate is obtained. Stoichiometric amounts of polyols and acids are used to form the alkyd. A preferred anhydride of this invention is 1,2,3,6-tetrahydrophthalic anhydride.

The intended applications for this invention are those in which the epoxy resin viscosity can be reduced by heat or by a reactive diluent, such as limonene dioxide. An example would be the coating of optical fibers. Another example would be protective coatings applied by thermal spraying.

The following examples are illustrative of alkyd resins and ultraviolet curable epoxidized alkyd resins embodying the invention and are not intended as limiting the scope thereof.

EXAMPLE I

The preparation of an alkyd of this invention using an epoxy grade of tall oil fatty acid can be accomplished as follows:

| Charge: | 145.5 g | ACINTOL ® EPG (tall oil fatty acid) |
|---|---|---|
| | 63.2 g | THPA (1,2,3,6 - tetrahydrophthalic anhydride) |
| | 42.8 g | Glycerine (96%) (polyol) |
| | 0.125 g | Phosphoric Acid |

Equipment: 500 ml, 3 neck flask equipped with an agitator, nitrogen inlet thermometer with thermowatch, steam heated precondenser, distillation head with thermometer, water cooled condenser, vacuum adapter, receiver, vacuum apparatus, heating mantle, and bubble trap.

Procedure:

(1) Charge all ingredients.

(2) Start a nitrogen sweep of the flask.

(3) Heat gradually to 220° C. with agitation. The head temperature should not exceed 100° C. during heat up.

(4) Hold 16 hours at 220° C.

(5) Gradually pull a vacuum (25" Hg) at 220° C. and maintain for 5–10 minutes. Break vacuum with $N_2$.

(6) Cool and analyze.

| Results: | |
|---|---|
| Acid Number | 4.3 |
| Color, Gardner | 3+ |
| Viscosity, 25° C. | 13,360 cps |
| Iodine Value | 123 |
| Hydroxyl Value | 14 |
| Yield | 92.4% |

EXAMPLE II

The preparation of an alkyd of this invention using an oleic acid can be accomplished as follows:

| Charge: | 145.5 g | EMERSOL ® 221 (oleic acid) |
|---|---|---|
| | 63.2 g | THPA (1,2,3,6 - tetrahydrophthalic anhydride) |
| | 42.8 g | Glycerine (96%) (polyol) |
| | 0.125 g | Phosphoric Acid |

Equipment: 500 ml, 3 neck flask equipped with an agitator, nitrogen inlet thermometer with thermowatch, steam heated precondenser, distillation head with thermometer, water cooled condenser, vacuum adapter, receiver, vacuum apparatus, heating mantle, and bubble trap.

Procedure:
(1) Charge all ingredients.
(2) Start a nitrogen sweep of the flask.
(3) Heat gradually to 220° C. with agitation. The head temperature should not exceed 100° C. during heat up.
(4) Hold 8 hours at 220° C.
(5) Gradually pull a vacuum (25" Hg) at 220° C. and maintain for 5–10 minutes. Break vacuum with $N_2$.
(6) Cool and analyze.

| Results: | |
|---|---|
| Acid Number | 6.4 |
| Color, Gardner | 4 |
| Viscosity, 25° C. | 9,900 cps |
| Iodine Value | 99 |
| Hydroxyl Value | 14 |
| Yield | 90.2% |

EXAMPLE III

The preparation of an alkyd of this invention using a standard grade of tall oil fatty acid can be accomplished as follows:

| Charge: | 145.5 g | ACINTOL ® FA-2 (tall oil fatty acid) |
|---|---|---|
| | 63.2 g | THPA (1,2,3,6 - tetrahydrophthalic anhydride) |
| | 42.8 g | Glycerine (96%) (polyol) |
| | 0.125 g | Phosphoric Acid |

Equipment: 500 ml, 3 neck flask equipped with an agitator, nitrogen inlet thermometer with thermowatch, steam heated precondenser, distillation head with thermometer, water cooled condenser, vacuum adapter, receiver, vacuum apparatus, heating mantle, bubble trap and a wiped film evaporator (WFE).

Procedure:
(1) Charge all ingredients.
(2) Start a nitrogen sweep of the flask.
(3) Heat gradually to 220° C. with agitation. The head temperature should not exceed 100° C. during heat up.
(4) Hold 16 hours at 220° C.
(5) Gradually pull a vacuum (25" Hg) at 220° C. and maintain for 5–10 minutes. Break vacuum with $N_2$.
(6) Cool and analyze.
(7) Pass the reaction mixture through a wiped film evaporator at 210° C. under a 0.1 mm Hg vacuum. The reaction mixture should be warmed to facilitate its flow.

| Results: | | | |
|---|---|---|---|
| Before WFE | | | |
| Acid Number | 7.1 | | |
| Color, Gardner | 4– | | |
| Yield | 94.3% | | |
| After WFE | | | |
| Residue | | Distillate | |
| Acid Number | 4.0 | Acid Number | 109 |
| Color, Gardner | 3 | Color, Gardner | 11– |
| Viscosity, 25° C. | 13,900 cps | Yield | 2.4% |
| Iodine Value | 123 | | |
| Hydroxyl Value | 19 | | |
| Yield | 97.6% | | |

EXAMPLE IV

Epoxidation of the alkyds of this invention can be accomplished as follows:

| Charge: | 75.0 g | Alkyd from Examples 1&3 | 75.0 g | Alkyd from Example 2 |
|---|---|---|---|---|
| | 150.0 g | Methylene Chloride | 150.0 g | Methylene Chloride |
| | 96.6 g | Peracetic Acid (32%) | 78.2 g | Peracetic Acid (32%) |
| | 2.5 g | Sodium Acetate | 2.0 g | Sodium Acetate |
| | 23.0 g | Water (distilled) | 18.6 g | Water (distilled) |

Equipment: 500 ml, 3 neck flask with agitator, $N_2$ inlet, thermometer with thermowatch, equilibrium addition funnel, ice bath, heating mantle, bubble trap, and separatory funnels.

Procedure:
(1) Charge the alkyd and $CH_2Cl_2$.
(2) Start a nitrogen sweep of the flask.
(3) Cool the alkyd solution to 20° C. with agitation.
(4) Dissolve the sodium acetate in water.
(5) Add the sodium acetate solution to the peracetic acid.
(6) Add the buffered peracetic acid solution dropwise below the surface of the reaction mixture.
(7) Allow the reaction mixture to exotherm to 30° C., then maintain the temperature at 25°–30° C.
(8) Agitate overnight at 25°–30° C.
(9) Pour the reaction mixture into 400 mls of distilled water.
(10) Separate the organic layer.
(11) Extract the water phase with 75 mls of $CH_2Cl_2$.
(12) Combine the $CH_2Cl_2$ extract with the organic phase.
(13) Wash the organic phase with 2×100 ml portions of distilled water.
(14) Wash the organic phase with 4×100 ml portions of 0.1% $Na_2CO_3$.

(15) Wash the organic phase with 100 mls of distilled water.
(16) Dry the organic phase with $Na_2SO_4$.
(17) Remove $CH_2Cl_2$ under vacuum with a rotoevaporator.

Results:

| Analysis | Epoxidized Alkyd (Example I) | Epoxidized Alkyd (Example II) | Epoxidized Alkyd (Example III) |
|---|---|---|---|
| Acid Number | 5.0 | 5.4 | 5.2 |
| Color, Gardner | <1 | <1 | <1 |
| Viscosity, 25° C. | 26,000 cps | 12,200 cps | 34,900 cps |
| Iodine Value | 0.6 | 2.6 | 1.9 |
| Yield | 79.2 g | 79.1 g | 79.3 g |

EXAMPLE V

A description of the cure and evaluation of the products of this invention is as follows:

Cure

Ingredients: 10.0 g of epoxidized alkyd/0.3 g of 3M's FX-512 (photoinitiator)

Procedure: The ingredients were mixed well in a 50 ml beaker with a spatula. A 3 mil film was drawn on a cold rolled steel panel with a draw down bar. The film was placed in direct sunlight.

Evaluation of Cured Material

The panels remained outside for 4–7 days before evaluation. The following results were obtained with films from the alkyds in examples 1–3 after they had been epoxidized as in example 4:

| Analysis | Cured Film From Epoxidized alkyd (Example I) | Cured Film From Epoxidized Alkyd (Example II) | Cured Film From Epoxidized Alkyd Example III |
|---|---|---|---|
| Film Appearance | Smooth, Glossy | Smooth, Glossy | Smooth, Glossy |
| Cure Rate[1] | ≅1 minute | ≅1 minute | ≅1 minute |
| Hardness, Pencil[2] | 4H | 4H | 4H |
| Adhesion Cross Hatch[3] | 5 | 5 | 5 |
| Impact Resistance[4] | P80F P20R | P120F P20R | P100F P20R |
| Weatherability[5] | | | |
| Yellowing | yes | yes | yes |
| Film deterioration | — | — | none observed |
| Water Resistance[6] | — | — | No effect |
| Chemical Resistance[7] | | | |
| HCl (10%) | — | — | No effect |
| NaOH (10%) | — | — | Partial film loss |
| Acetic Acid (5%) | — | — | Darkened, blisters |
| MEK | — | — | No effect |
| $CH_2Cl$ | — | — | No effect |
| Methanol | — | — | No effect |
| Ethyl Acetate | — | — | No effect |
| Xylene | — | — | No effect |
| Xylene/IPA (50/50) | — | — | No effect |
| Gasoline | — | — | No effect |
| Mineral Oil | — | — | No effect |
| Ethanol (200 proof) | — | — | No effect |
| Ethanol (3A) | — | — | Blisters |

[1]Dry to touch in direct sunlight
[2]8H is hardest → HB (soft) → 6B (very soft)
[3]On a scale of 1–5,5 is best
[4]P = pass, F = forward, R = reverse. Highest is 160. Units are in.-lbs. This is a measure of flexibility.
[5]After three months of outside exposure. Slight yellowing is evident within days.
[6]After six months of water immersion of the panel
[7]Seven day chemical spot test

EXAMPLE VI

The use of Limonene Dioxide (LDO) to reduce the viscosity of an expoxidized alkyd is described as follows:

| Analysis | Epoxidized Alkyd | Epoxidized Alkyd/LDO (80/20) |
|---|---|---|
| Viscosity, 25° C. | 31,300 cps | 4,060 cps |
| Viscosity, 40° C. | 7,560 cps | 1,350 cps |
| Cured Film (Refer to Example V) | | |
| Film Appearance | Smooth, Glossy | Smooth, Glossy |
| Cure Rate | ≅1 minute | ≅1 minute |
| Hardness, Pencil | 4H | 4H |
| Adhesion, Cross Hatch | 5 | 5 |
| Impact Resistance | P120F P20R | P80F P20R |

EXAMPLE VII

The use of trimethylolpropane (TMP) as the polyol instead of glycerine is described as follows:

Alkyd Charge: 145.5 g ACINTOL ® EPG (tall oil fatty acid)
63.2 g THPA (1,2,3,6 - tetrahydrophthalic anhydride)
61.6 g Trimethylolpropane (TMP) (polyol)
0.125 g Phosphoric Acid Alkyd Equipment and Procedure: Same as Example I Results:

| Analysis | TMP Based Alkyd | Glycerine Based Alkyd |
|---|---|---|
| Acid Number | 13.7 | 4.3 |
| Color, Gardner | 3+ | 3+ |
| Viscosity, 25° C. | 10,500 cps | 13,360 cps |
| Iodine Value | 114 | 123 |
| Hydroxyl Value | 23 | 14 |
| Yield | 89.0% | 92.4% |

Epoxidation: Same as Example IV

Epoxidation Results:

| Analysis | TMP Based Epoxidized Alkyd | Glycerine Based Epoxidized Alkyd (Example I) |
|---|---|---|
| Acid Number | 10.1 | 5.0 |
| Color, Gardner | <1 | <1 |
| Viscosity, 25° C. | 22,850 cps | 26,000 cps |
| Iodine Value | 3.1 | 0.6 |
| Yield | 81.3 g | 79.2 g |

Cure and Evaluation: Same as Example V

Results:

| Analysis | TMP Based Cured Material | Glycerine Based Cured Material |
|---|---|---|
| Film Appearance | Smooth, Glossy | Smooth, Glossy |
| Cure Rate | ≅2.5 minutes | ≅1 minute |
| Hardness, Pencil | 2H | 4H |
| Adhesion, Cross Hatch | 5 | 5 |
| Impact Resistance | P160F | P80F |
|  | P40R | P20R |

An increase in film flexibility is gained at the expense of cure rate.

EXAMPLE VIII

The use of methyl tetrahydrophthalic anhydride (MTHPA) instead of THPA as a diacid with cycloaliphatic unsaturation is described as follows:

| Alkyd Charge: | 145.5 g | ACINTOL ® EPG (tall oil fatty acid) |
|---|---|---|
|  | 63.2 g | MTHPA |
|  | 40.7 g | Glycerine (96%) (polyol) |
|  | 0.125 g | Phosphoric Acid |

Alkyd Equipment and Procedure: Same as Example III

Results:

| Analysis | MTHPA Based Alkyd | THPA Based Alkyd |
|---|---|---|
| Acid Number | 11.9 | 4.0 |
| Color, Gardner | 2+ | 3 |
| Viscosity, 25° C. | 9,300 cps | 13,900 cps |
| Iodine Value | 120 | 123 |
| Hydroxyl Value | 25 | 19 |
| Yield | 90.5% | 92.0% |

Epoxidation: Same as Example IV

Epoxidation Results:

| Analysis | MTHPA Based Epoxidized Alkyd | THPA Based Epoxidized Alkyd (Example III) |
|---|---|---|
| Acid Number | 6.3 | 5.2 |
| Color, Gardner | <1 | <1 |
| Viscosity, 25° C. | 24,500 cps | 34,900 cps |
| Iodine Value | 2.2 | 1.9 |
| Yield | 82.9 g | — |

Cure and Evaluation: Same as Example V

Results:

| Analysis | MTHPA Based Cured Material | THPA Based Cured Material |
|---|---|---|
| Film Appearance | Smooth, Glossy | Smooth, Glossy |
| Cure Rate | ≅1.5 minutes | ≅1 minute |
| Hardness, Pencil | 4H | 4H |
| Adhesion, Cross Hatch | 3 | 5 |
| Impact Resistance | P140F | P100F |
|  | F20R | P20R |

While the invention has been described and illustrated with specific materials and procedures, it is understood that the invention is not restricted to those employed for this purpose. Numerous variations of such materials and procedures can be employed, as will be appreciated by those skilled in the art.

What is claimed is:

1. An ultraviolet curable epoxidizable alkyd resin consisting of:
   (a) an unsaturated fatty acid,
   (b) an anhydride or diacid containing cycloaliphatic unsaturation, and
   (c) a polyol.

2. A resin in accordance with claim 1, where the unsaturated fatty acid is a tall oil fatty acid which does not contain dimethoxystilbene.

3. A resin in accordance with claim 1, where the unsaturated fatty acid is a tall oil fatty acid and dimethoxystilbene is subsequently distilled from the alkyd with a wiped film evaporator.

4. A resin in accordance with claim 1, where the unsaturated fatty acid is oleic acid.

5. A resin in accordance with claim 1, where the anhydride is 1,2,3,6-tetrahydrophthalic anhydride.

6. A resin in accordance with claim 1, where the anhydride is methyl tetrahydrophthalic anhydride.

7. A resin in accordance with claim 1, where the polyol is glycerine.

8. A resin in accordance with claim 1, where the polyol is trimethylolpropane.

* * * * *